Patented Nov. 15, 1949

2,488,016

UNITED STATES PATENT OFFICE 2,488,016

MECHANISM FOR ROAD GRADERS

Anthony L. Lado, Rome, N. Y., assignor to The Union Fork & Hoe Company, Columbus, Ohio, a corporation of Ohio Original application March 17, 1944, Serial No. 526,959. Divided and this application October 26, 1945, Serial No. 624,748

9 Claims. (Cl. 37—145)

1

My invention relates to improvements in road grader mechanisms, and relates more particularly to such mechanisms as are equipped with a scarifier disposed forwardly of the grader blade.

In the operation of road graders, after the operator had caused the vehicle to travel forwardly, it is often desirable to retraverse the terrain previously operated upon, or to traverse a stretch of terrain at the side of that previously operated upon, and the lack of space or the condition of the terrain renders reversal of the facing direction of the vehicle difficult and time consuming, and therefore undesirable, in cases where the stretch of road traversed in the forward direction is not of great length.

Road grader mechanisms are now commonly provided with power actuated devices to variously adjust the positions of the blade and scarifier, but so far as I am aware, the position of the scarifier even when in an upper retracted position, does not permit ready and relatively rapid reversal of the blade from a single operator's station, without temporary dismounting of parts, and to afford grading operations with the grader vehicle moving backwardly over the terrain.

Therefore, it is an object of my invention to provide improved road grader mechanism whereby power means for both the scarifier and the blade may be readily actuatable, through effortless operation of controlling means at the operator's station, for first effecting ample lifting of the scarifier, then to tilt the blade to minimize its vertical extent and to rotate the blade about a medial vertical axis over any reversing angle; then to restore the tilted blade to a normal grading attitude and ground engaging elevation, whereby rearward movement of the vehicle will effect a grading or scraping operation.

Another object of my invention is to accomplish the foregoing object through the use of hydraulic or fluid pressure, or equivalent power means, whereby the grader blade may be elevated above the level of the ground and placed in a horizontal plane, and may readily be rotated without its end portion engaging the superposed scarifier mechanism.

Another object of my invention is to achieve the aforesaid objects through the instrumentality of motion-multiplying means associated with the said fluid pressure power means, all being quickly actuated by the effects of fluid pressure, controlled by the operation of easily operable controls for operating valves, said controls being being conveniently disposed at the operator's station.

Another object of my invention is to effect a co-relation of power operated hydraulic or like fluid pressure rams and motion-multiplying means of a type whereby the scarifier may be rapidly sufficiently lifted to provide ample space between its lowermost portions and the terrain to permit the grader blade to be rotated without

2 contact between said blade, and the terrain or scarifier, one of the ends of the moldboard-blade unit, in downwardly facing attitude, being passed below the scarifier.

Another object of my invention is to achieve the foregoing objects in a mechanism comprising improved fluid pressure means to place the grader blade in a substantially horizontal plane near to but above the terrain to achieve a lesser vertical over-all thickness, whereby, when the scarifier lifting apparatus of my invention has effected lifting of the scarifier mechanism above such terrain, other fluid pressure means may rotate the tilted blade on a vertical axis to swing the blade over a complete circle or any part thereof, without engagement of the end portions of the blade or moldboard, with any part of the lifted scarifier mechanism.

Another object of my invention is to achieve the foregoing objects, and each of them, in a grader mechanism employing a blade, of considerable end-to-end length, and to accomplish all of said objects by adjustments of the various adjustable parts by selective manual operation of operator controllable means all located at the operator's vehicular driving station of the mobile grader.

Other objects of my invention and the invention itself will become more apparent from the following description of an embodiment of my invention, illustrated in the accompanying drawings, and which is described in the specification hereon, in which drawings:

The present application for patent is divisional from my previously filed application, Serial No. 526,959, filed March 17, 1944, wherein the grader mechanism herein disclosed is, in parts, more completely illustrated and described.

Although my invention is subject to application to graders of widely varying types, I have illustrated the same as applied to an improved design road grader of the power type wherein a prime mover such as an automotive engine carried by the grader vehicle frame produces power to operate the various mechanisms with which the grader is equipped.

My invention herein particularly relates to the application of hydraulically operated motors comprising a preferably rotary motor for rotating the grader blade on an upwardly extending axis in a transverse plane, and a reciprocatory hydraulic ram employed to adjust and hold adjusted various elements of the grader mechanism, including a ram adapted to variously tilt said blade on a transverse axis, other such rams to variously adjust the grader blade-carrying sub-frame, and to adjustably elevate or lower the scarifier, as hereinafter more fully described.

The road grading vehicle

The vehicle illustrated in the drawings, and to which my invention is shown as being applied, comprises the longitudinally extending upwardly arched main frame beams 1 and 2, of preferred I-beam cross section, which are welded together at the forward ends as at 1' and 2'. To the forward portions of said main frame beams, the ground engageable implements and ancillary equipment are secured, and upon the rear portion of said beams, where said beams are relatively more widely spaced and extend in parallel relation, the automotive vehicular supporting wheels, motor, and ancillary equipment are secured.

Steerable and laterally leanable front wheels 61 carry the forward end of the chassis frame, and a pair of tandem wheels 53 are disposed at each rear side of the frame, to afford support for the main frame through appropriate chassis and wheel supporting means of any known appropriate type. A pair of tandem axles and a suspension structure is secured to each main frame beam, for supporting the frame upon the axles. Suitable means to apply power simultaneously to said rear tandem wheels are provided, said means driving the pairs of wheels at the two sides differentially, and each of said pairs of wheels being interconnected to the main frame beams by a preferably rigid element 180 joined at its opposite ends to the parallel rear axles, said element being intermediately swivelably secured to a bracket indicated at 74 which, in turn, is rigidly secured to the main frame and carries a journal for the laterally extending bogie shaft 173 upon which the main frame is supported.

Many suitable types of structure for intermediately and swivelably interconnecting the two wheels of each tandem pair to the main frame and for differentially driving the tandem pairs of wheels at the two sides of the vehicle may be employed and the same, being well known and not comprising any part of my invention, are not herein specifically illustrated nor described.

Figure 2:
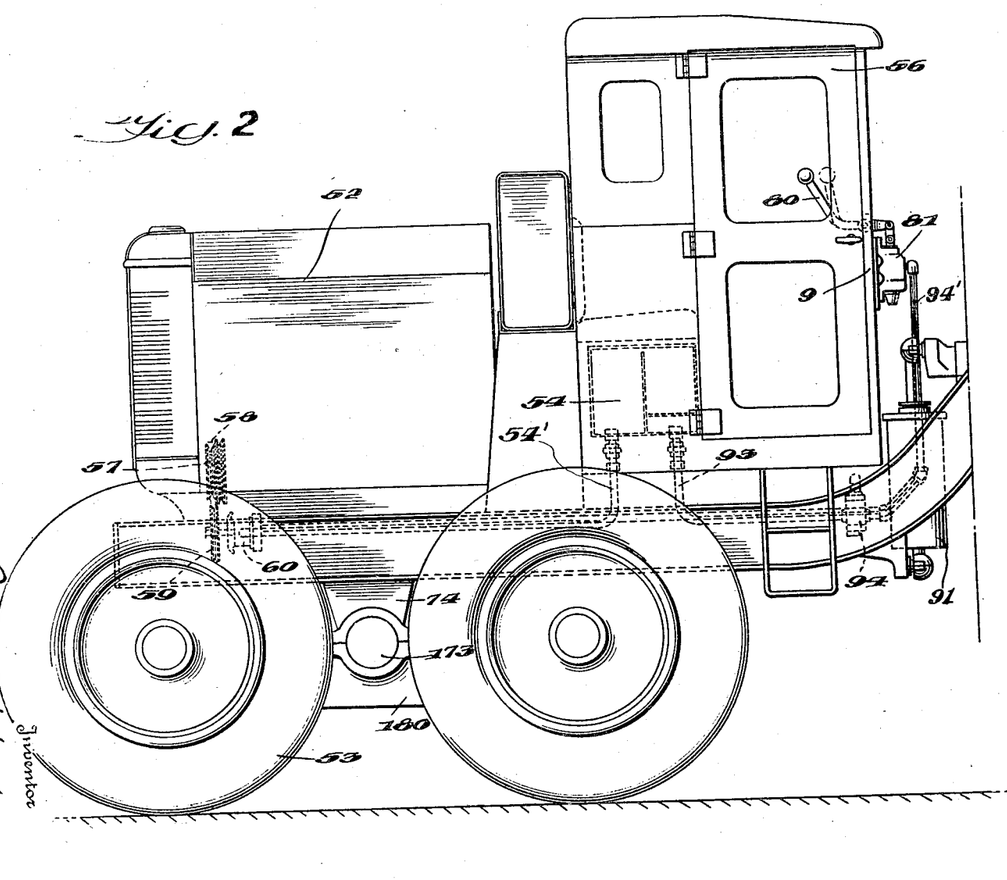

The automotive engine or other motor is disposed within the enclosure 52, here comprising the hood and radiator, and drives the pulley 57, which, by means of the intermediate belt 58 and pulley 59, drives a hydraulic pump 60. The pump and the conduits shown by dotted lines in Fig. 2, are illustrated diagrammatically in Fig. 14, and functionally described under the heading "The hydraulic system."

The vehicle also carries an operator's cab housing 56, whose forward wall supports an instrument panel, which carries a number of hydraulic valve mechanisms and the manually operable controlling means therefor which are carried on said instrument panel, as well as the usual oil reservoir 54 of such a hydraulic system.

Road working appliances

Figures 5, 6:
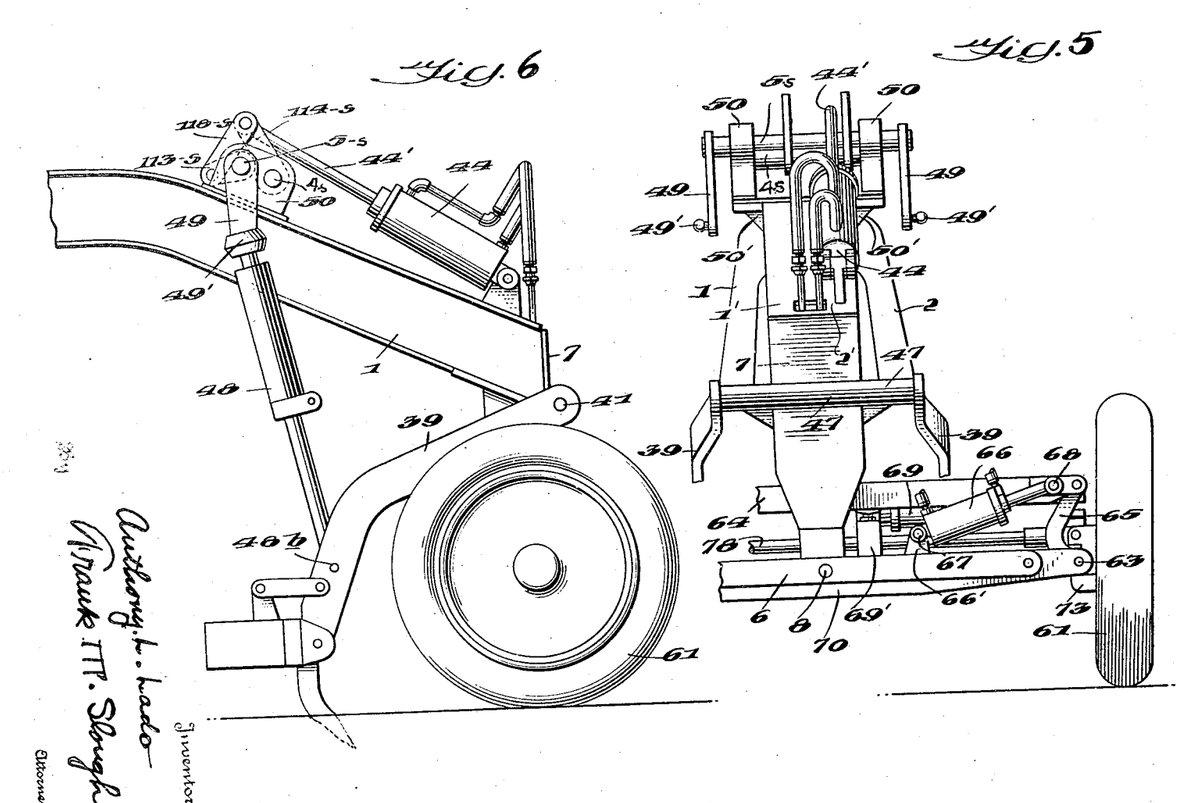
Figs. 5 and 6 are front and side elevational views, respectively, of the front end portion of the grader mechanism to illustrate the scarifier and operating means therefor, Fig. 5 having certain parts broken away or omitted.

The grader comprises also a supplemental or sub-frame 75 (see Figs. 3 and 4) comprising a pair of forwardly converging beams 4 and 5, cross-beams 12 and 13, the forward end being flexibly universally connected, at 140 (Fig. 15), to an upstanding forward bolster 7 which is rigidly secured by bolts or by welding, to the main frame 1, which is hingedly secured to the front axle 6, by an interconnecting bearing pin 8 which is disposed in the longitudinal axis of the vehicle (Fig. 5).

The sub-frame is universally connected to the bolster to permit independent lateral, upward, and tilting or swinging movements of the sub-frame. The sub-frame extends rearwardly from its point of connection with the bolster element of the main frame to a medial region thereof, and substantially in advance of the operator's control panel 9 (Fig. 2).

Figures 3, 4:
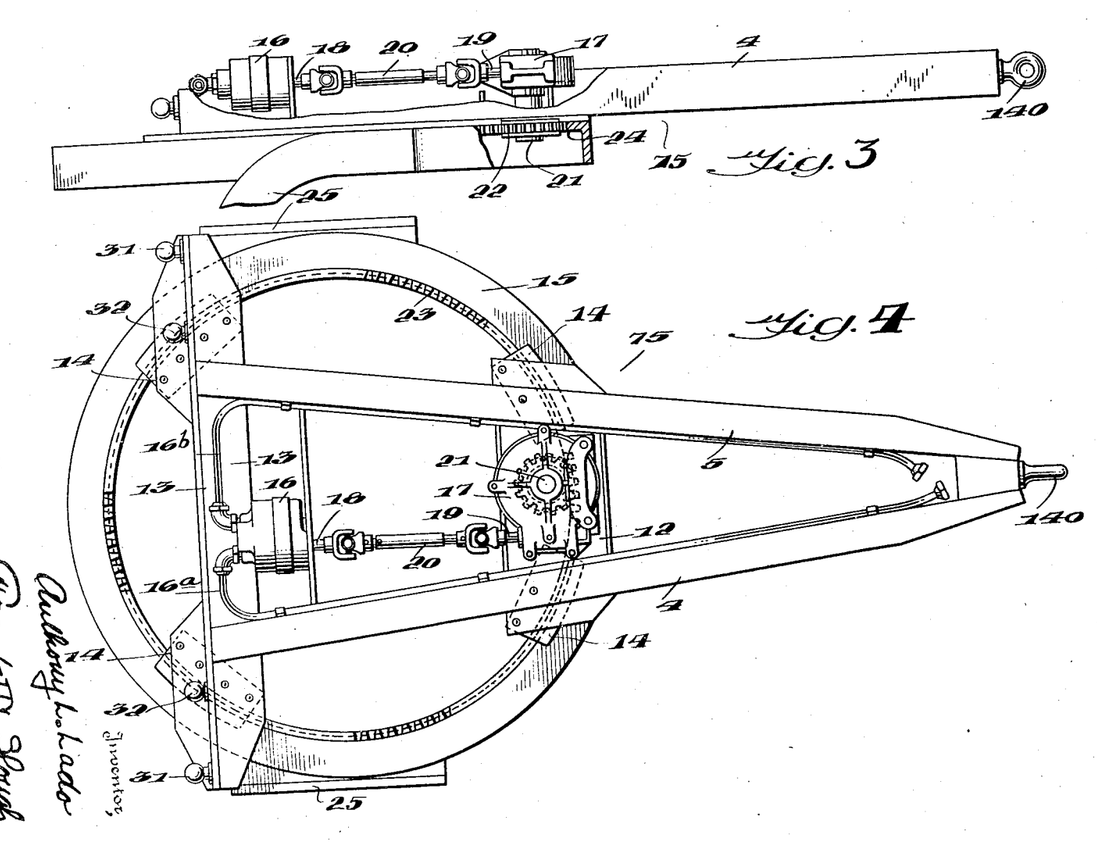
Fig. 3 is a side elevational view of an implement-carrying sub-frame of the general type commonly employed to support a grader blade in different operative positions.
Fig. 4 is a top plan view of the mechanism of Fig. 3.

The sub-frame cross beams 12 and 13, as shown in Fig. 3, support bearing elements 14, provided to support the rotatable blade carrying circle 15 which is journalled for rotation upon said bearings.

To opposite sides of the circle 15, spaced blade supporting arms 25, shown in Figs. 1, 7, 9, 10 and 15, extend pendently to carry the moldboard assembly 260 which supports the moldboard 270 and grader blade 27.

The blade proper 27 may be in the form of an elongated narrow strip 27, having a lowermost sharp edge 27' adapted to be bolted or otherwise rigidly affixed to the lowermost portion of the moldboard 270; in this specification, the term "length" is conveniently employed to designate the greatest dimension of the blade or moldboard, although some workers in the art term this dimension the "width."

A hydraulic rotary motor 16 (Fig. 4) is provided for rotating the circle 15 which carries the blade supporting moldboard assembly 260.

A gear case 17, carrying a gear reduction unit comprising a driving worm gear and gear means cooperating therewith, is also rigidly supported on the cross beam 12 and the worm driving element thereof is driven through the drive shaft linkage comprising the hydraulic motor shaft 18, a worm gear driving shaft 19, and an interconnecting telescopic shaft 20, the latter being universally connected at its end to the ends of the shafts 18 and 19.

The gear train disposed within the casing 17 is adapted to communicate rotative motion to a pinion shaft 21 which carries at its lower end the circle driving pinion 22 which is constantly in mesh with the teeth 23 of the annular internal gear provided by the end of the inwardly directed flange 24 of the circle 15.

Figure 14:
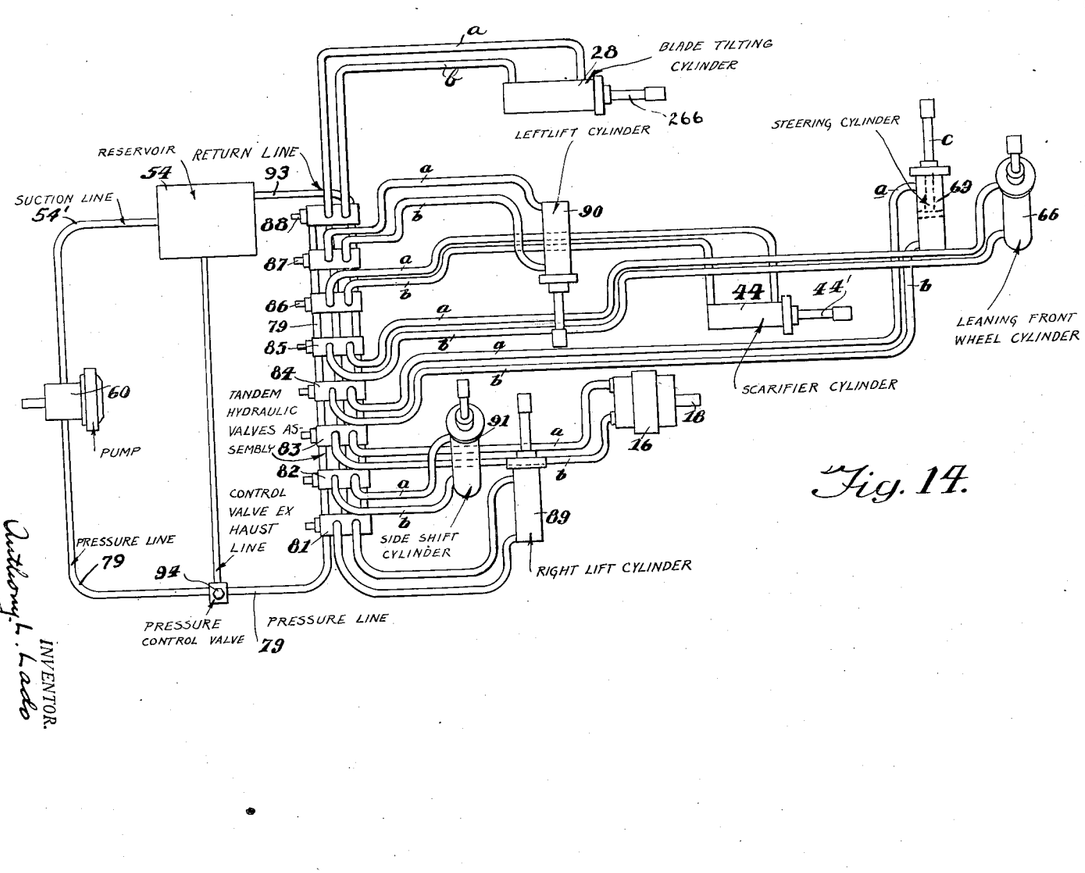
Fig. 14 illustrates diagrammatically the fluid system for remotely controlling the application of hydraulic fluid, under pressure, to various power rams shown in the foregoing figures, under the control of manually operable valves, all disposed at a single operator's station.

The direction of rotation of the motor 16 is determined by selective choice of two directions of flow of hydraulic liquid passing through the conduits 16a and 16b leading to the motor 16, from the controlling valve 83, as effected by the hydraulic pump 60, the pump being shown in Fig. 14, being further indicated in Fig. 2. The circle 15, when rotated to a given operative position, will resist displacement therefrom because of the inherent irreversibility of the worm and pinion drive disposed within the gear case 17, the worm thereof being driven by the motor. The motor 16 is adapted to rotate the circle any desired part of a revolution or any number of complete revolutions.

The rearmost cross beam 13 of the supplemental frame 75 is provided with two like pairs of laterally outer and inner, rearwardly presented ball elements 31 and 32, one pair of said ball elements 31 being disposed nearest the ends of the cross beam 13, and each ball of the other pair 32 being spaced somewhat inwardly of said cross beams.

Generally, the movements of the sub-frame are effected by oscillatory swinging movements of lift cranks 104 and 105, at opposite sides of the main frame (see Fig. 8), and by oscillatory movements of the intermediately disposed side-shift crank 40, according to the principles disclosed in the prior patent to Gledhill, Re. 16,624, dated May 17, 1927. Preferably, herein, the said cranks are adjusted or held in a desired swung position by the controlled effect of two-way fluid pressure actuated rams, 89 and 90, for the lift cranks 104 and 105, and the ram 91 for the side shift crank 40.

Lift links 26 and a side-shift link 38 communicate the swinging motion of the respective cranks 104, 105 and 40 to the sub-frame, and circle 15 carried thereby, whereby the circle carried blade can be adjusted vertically at either end, and be moved laterally as, and to the extent, desired, as for instance, to a substantially end-wise vertical position in spaced relation to, and at the side of, the vehicle.

Preferably, the side lift links 26 (Fig. 1) comprise an upwardly extending rod 26a telescoped into the downwardly extending tubular sleeve 26b, the rod having a transversely extending bore which which is alignable with one or the other of the transverse bores, such as 26', extending through the sleeve whereby the effective length of the links 26 may be varied, a pin 26c securing said sleeve and rod.

Figure 1:
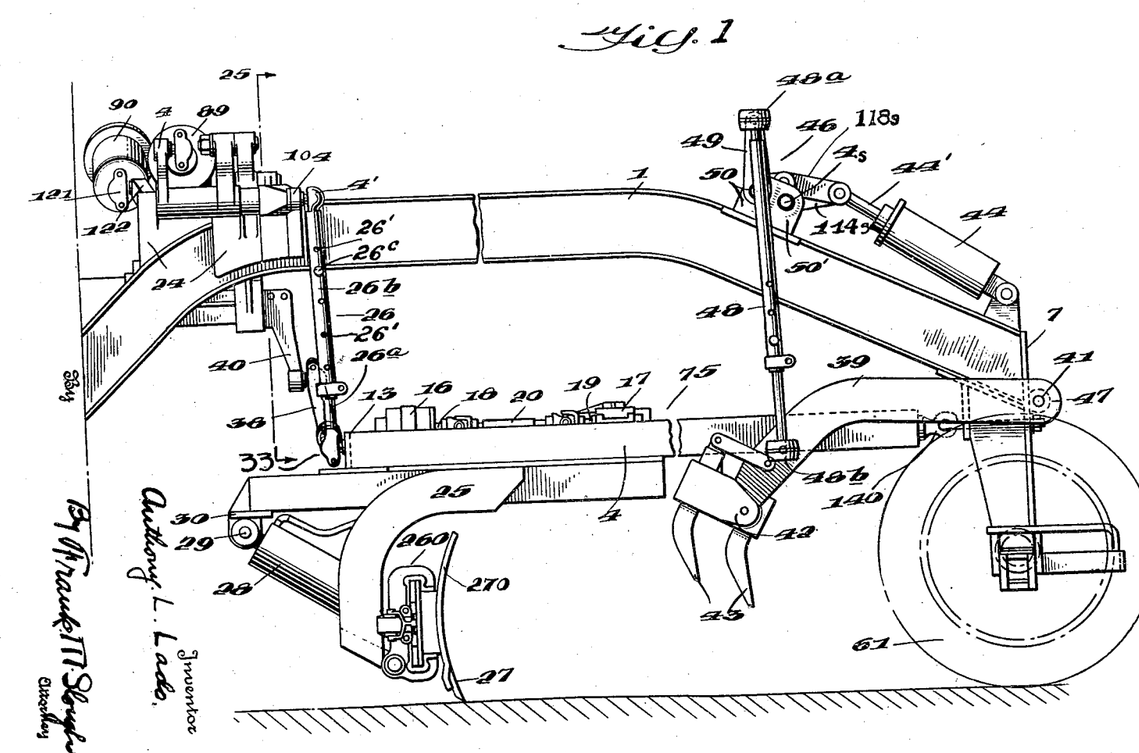
Figs. 1 and 2 illustrate respectively in side elevational view the front and rear portions of a power grader mechanism embodying the principles of my invention, a portion of the main frame and sub-frame draw bars being shown as broken away for the purpose of condensing the showing of the illustrated operative parts.
Figure 8:
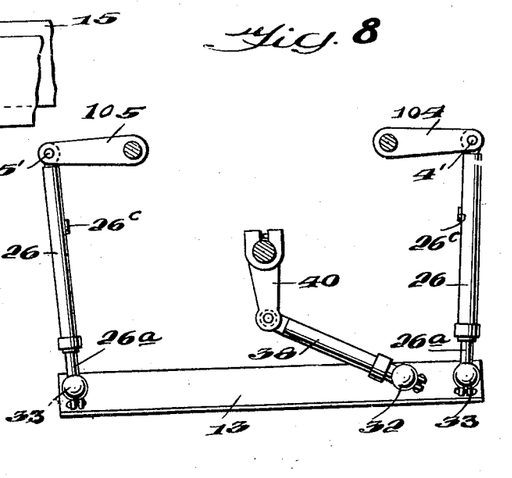
Fig. 8 is a diagrammatical view, not necessarily to scale, being somewhat of the nature of a rear elevational view of a rearwardly disposed transverse angle frame portion of the sub-frame portion, and showing rear cranks and links by which the sub-frame is variously swung to different operative positions and attitudes.

The lift cranks 104 and 105, Figs. 1 and 8, are preferably journalled upon stationary shafts 11 which, in turn, are each rigidly carried by the main frame beams 1 and 2 by brackets 24 preferably welded to the sides of said beams (Fig. 4) and said cranks are adapted to rotate about said shaft axis.

As best shown in Figs. 1 and 8, the pair of lift links 26 each interconnect, by a universal joint connection at both ends, the free end of one of said lift cranks 104 and 105, and the associated ball connector 31 secured to the rearmost sub-frame cross beam 13, which is disposed at the corresponding lateral end of said sub-frame cross beam.

Therefore, upon rotation of either or both of the lift cranks 104 and/or 105 from the position, as shown in Fig. 1, to any more upwardly disposed position, each of said cranks will lift the corresponding end of the blade according to the degree of elevation of the end of such lift crank.

The side shift crank 40, shown in its lowermost position in Fig. 1, when rotated about the crank axis will shift the entire sub-frame laterally according to the degree of angular displacement of said side shift crank, and side shift link 38 is respectively universally connected at one of its two ends to the ball connector 40a of the side-shift crank, and at its other end to a predetermined one of the ball connectors 32, carried by the rearmost sub-frame cross beam 13.

All universal joint connections of said lift and side shift links to the crank connector balls and sub-frame connector balls are preferably of the usual ball and socket type, said connectors carrying the sockets which are fitted in encompassing relation onto the connector balls. The side shift crank is adapted to be interchangeably connected to either one of the connector balls 32 to adapt the side shift crank to shift the sub-frame alternately towards or to the two sides of the vehicle, to the greatest possible extent.

The mutual functional relationship as between the two lift link cranks and the side shift crank is well known and understood and is generally disclosed in the Gledhill Patent No. 1,528,325, dated March 3, 1925, and from such disclosure it will be understood that the blade may be adjusted by said cranks and their associated links to a more or less upright or inclined position laterally of the vehicle, as for grading a steep slope.

The sub-frame lift adjustment cranks 104 and 105, the side shift crank 40 and the scarifer lift cranks are adapted to be adjustably swung by the power of reciprocating hydraulic motors or rams, and may be hydraulically locked in a given adjustive position.

Since I deem it important to achieve a greater angle of crank swing than has previously been attained by such grader implement adjustment cranks when actuated by hydraulic rams, and desire to retain the use of relatively simple powerful ram-type motors, I have provided motion multiplying crank swinging transmission linkage mechanisms, for each said cranks.

These are much alike and a brief description of the linkage mechanism for the lift cranks 104 and 105 will provide a clear understanding of the structure, the mode of operation, and results secured by the several variant forms herein disclosed.

Figure 11:
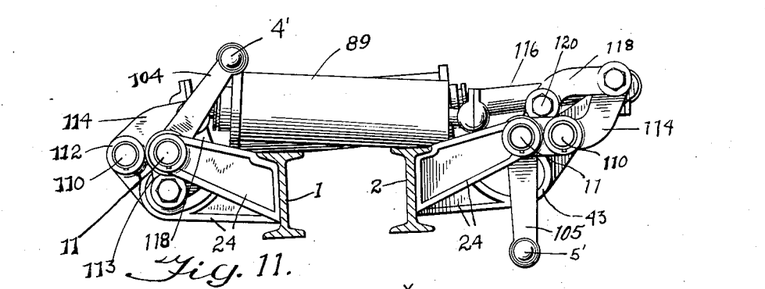
Fig. 11 is a front elevational view of the sub-frame adjusting crank operating mechanism, in a different operative adjustment position from that indicated in Figs. 1 and 8.
Figure 12:
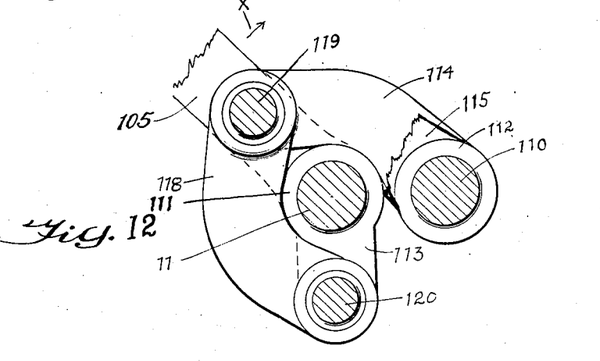
Figs. 12 and 13 are front sectional views to illustrate two different positions of the crank operating adjustment mechanism employed to adjust the sub-frame and scarifier.
Figure 13:
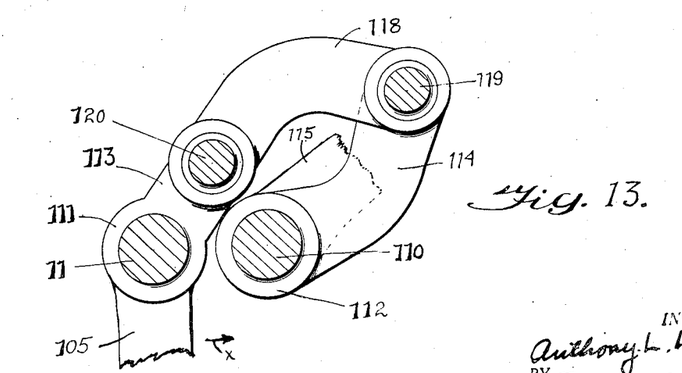

Reference will now be made to Figs. 11, 12 and 13, wherein there is shown a pair of bell crank levers, respectively, having hubs 111 and 112, the first having arms 113 and 105, extending relatively angularly from a hub 111, and the second having arms 114 and 115, extending nearly in parallel relation from the hub 112. The bell crank levers are hingedly interconnected by a curved link 118 and by hinge pins 120 and 119 at the ends of said link. Link 118 and the crank arm 114 are preferably curved, as shown, and when the mechanism is in its most contracted adjustment, as shown in Fig. 12, the inner edges of said link and crank arm curvilinearly closely embrace the hub 111 of the first said bellcrank.

As shown in the end elevational views of Figs. 11 to 13 inclusive, the bell crank levers are journalled by their respective hubs 111 and 112 upon a pair of parallel immovable shafts 11 and 110 upon the main frame beams 1 and 2 of the support brackets 24, Figs. 1 and 11, which interconnect said immovable shafts and the grader frame.

Each bell crank unit 112, 114 and 115, therefore is readily understood as being the unit of the associated transmission mechanism which is initially actuated by the hydraulic ram, whereby thrust or pull effort from the ram is communicated to the intermediate link 118 which, by hinge pins 119 and 120, is hingedly connected with and interconnects the ends of the crank arms 114 and 115 of the unit.

By virtue of the above form and disposition of the curved crank arm 114 and the link 118 which interconnects the crank hub 112 with the outer end of the short crank arm 113, together with the radially spaced positioning of the axes of hubs 111 and 112 when the hub 112 is rotated over a given angle, as for instance an angle of 108° communicated to it by the hydraulic ram as through the piston rod 116, universal joint 117 and motivating crank arm 115, the crank arms 113 and 105 are moved in a clockwise direction about the axis of the hub 112, a distance of 216°, as indicated in Fig. 13.

This two-to-one increase in angular displacement of the crank arm 105, over that of the crank arm 115 is effected by an "unwinding" pull upon the short crank 113 through the two hinge connectors 119 and 120, thereby "unwinding" the arm 114 and link 118 from about the crank hub 111 to cause the above designated parts to take the relative positions shown in Fig. 13 wherein the crank arm 114, which, in Fig. 12, is illustrated as extending diagonally upwardly towards the left, is, in Fig. 13, shown as rotated to a vertical downward position.

Since the motivating ram, such as 89 of Fig. 11, is universally connected to its fixed mount by the universal joint 121 to its mounting bracket 122, progressive tilting of the ram cylinder 89 and rod 116 permits rotation of the crank 115 over an angle of approximately 108°, to achieve an angular throw of 216° of the crank 105.

It will be understood that the angular relationship as between the arms 115 and 114 extending from the common hub 112 may, in practice, be varied, and will be dictated by the mounting position and attitude of the ram such as that shown at 89, Fig. 11, employed to actuate the transmission mechanism through its piston rod 116.

Mechanism for tilting the moldboard

The adaptability of the blade carrying circle to be rotated indefinitely in either direction, as desired, by the hydraulic motor 16, coupled with the hydraulic means for tilting the blade carrying moldboard together with the hydraulic scarifier adjusting means 44 affords the means of utilizing remotely controllable mechanism disposed at a single control station, at 9, adjusting the blade to a rearwardly facing operative position, and for subsequently restoring said blade.

Although the scarifier may be hydraulically elevated to a limited extent until its frame 39—42 engages the underside of the sub-frame 4, yet the clearance below the teeth 43 and the terrain is commonly much less than the height of the moldboard and blade unit, and except for the disclosed means for first adjusting said moldboard and blade unit to a downwardly facing attitude, reversing rotation of the unit would be prevented by the obstacle presented by the scarifier.

The means whereby the moldboard and grader blade are tilted will now be described.

Figure 7:
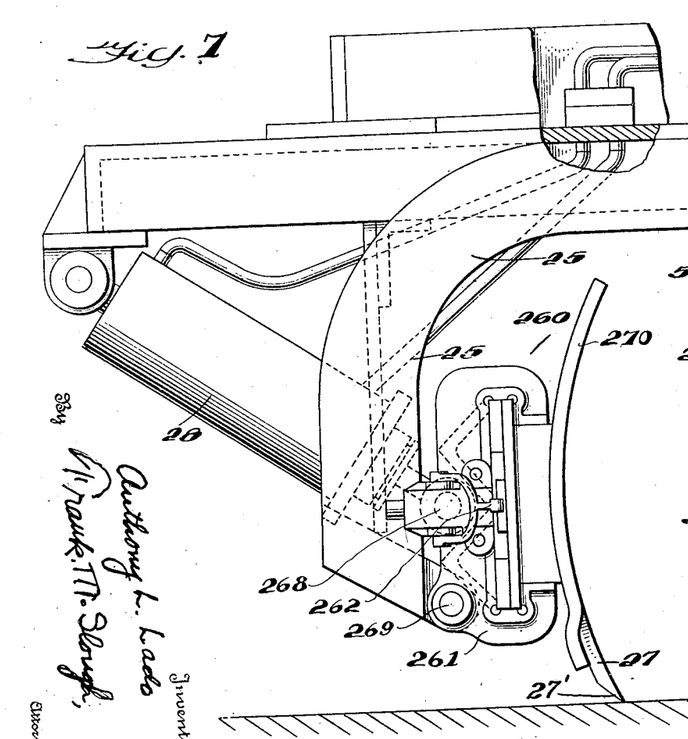
Fig. 7 is a side elevational view of the rear portion of the sub-frame and the grader blade supported thereby, and operating means to rotatively adjust the grader blade on a transverse hinging axis.
Figures 9, 10:
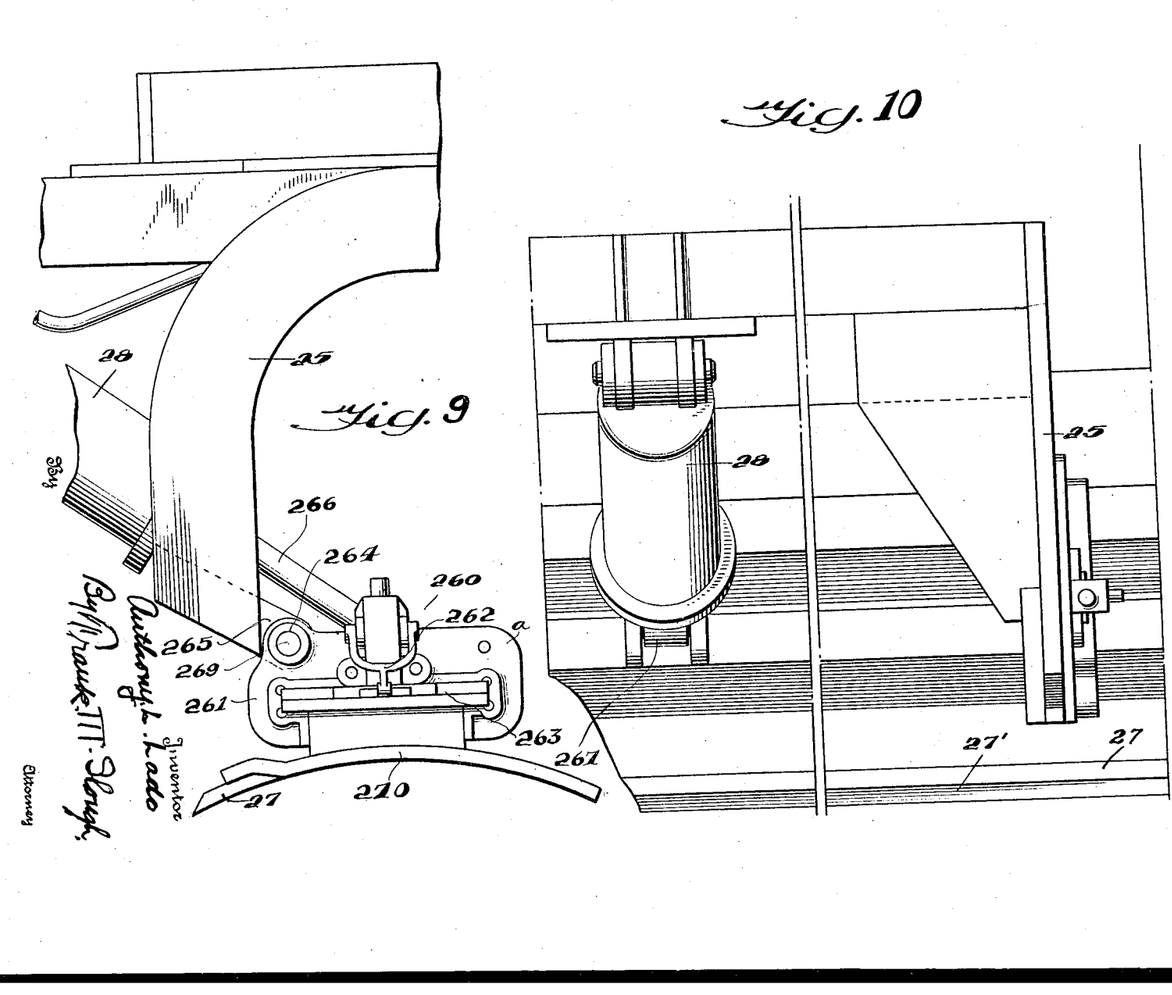
Fig. 9 is a view generally of the nature of that of Fig. 7 but illustrating a remotely controllable tilting adjustment of the grader blade on a transverse hinging axis, effected by an adjustment operation of a power ram shown in Fig. 7, whereby the grading face of the blade may be lowered and faced downwardly.
Fig. 10 illustrates the apparatus of Fig. 7 in rear elevational view.
Figure 15:
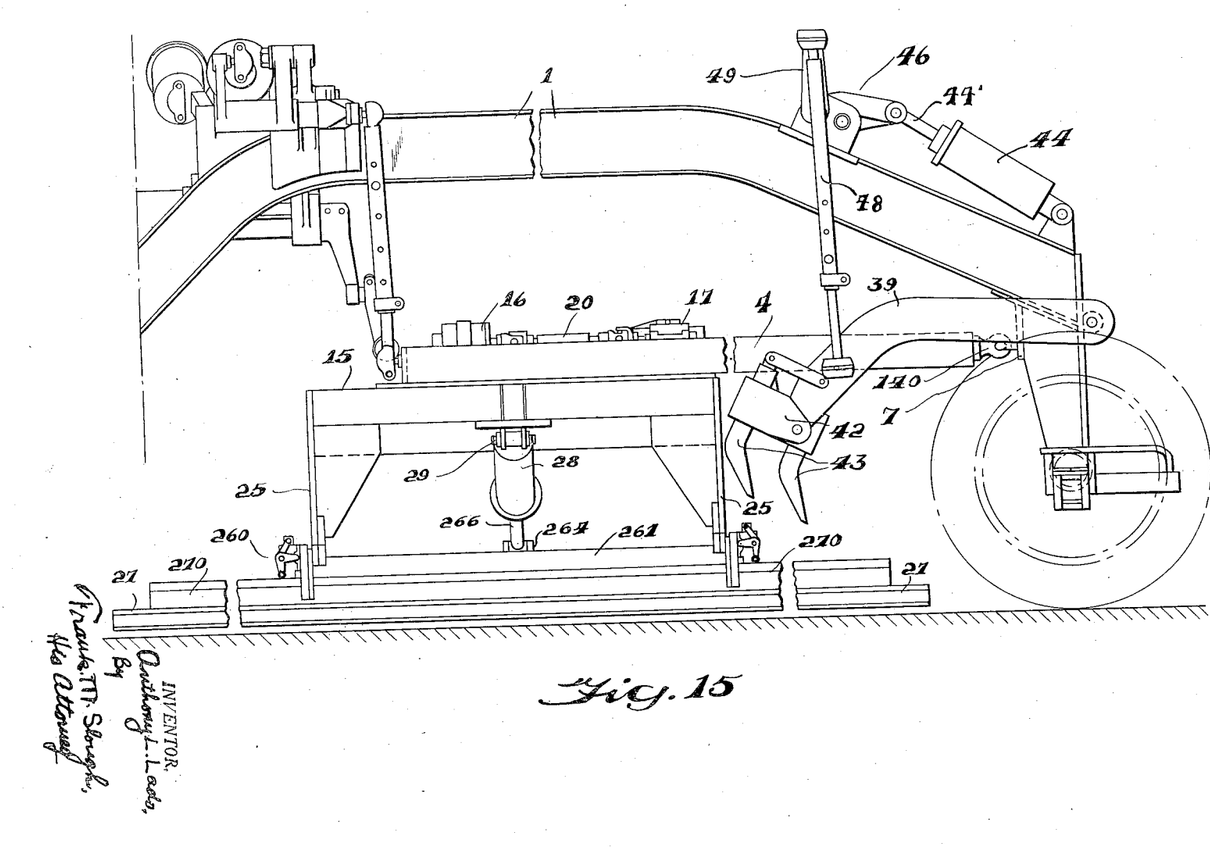
Fig. 15 is a side elevational view of the portion of the grader mechanism which is disposed forwardly of the operator's station with the scarifier in an uppermost lifted adjusted position, and the rotary blade supporting carriage partially rotatably adjusted towards a reversed position, to cause the blade to extend longitudinally of the grader below the scarifier, and said blade being moreover downwardly faced in close proximity to the underlying terrain but in proximity thereto, a portion of the main frame, sub-frame draw bars and moldboard with grader blade being shown as broken away for the purpose of longitudinally condensing the showing of the illustrated operative parts.

The moldboard assembly comprises an assembly of interlinked parts to permit by operation of a hydraulic jack 28 any desired tilting adjustment of the moldboard 270 and blade 27 which are shown in Fig. 7 as adjusted by the jack to a substantially vertical position, or as illustrated in Figs. 9 and 15, where the moldboard and blade unit is adjusted to a substantially horizontal position, the purpose of the latter adjustment being to lower the upward extent of the end portion of said unit to facilitate such extended rotation of the circle as to permit complete reversal of the moldboard, which is featured by the ends of the blade and moldboard being arcuately swung below the lifted scarifier when adjusted as in Fig. 15.

The hydraulic jack, like the supporting arms 25, is adapted to be carried by the circle so as to be presented in varying directions according to the degree of rotation of said circle, the jack being hingedly secured by a hinge connection 29 to a bracket 30 rigidly secured to the circle, as shown in Fig. 1.

The jack 28, when hydraulically energized, is adapted to tilt the moldboard from the more vertical attitude of Fig. 7 to the lowered horizontal position, illustrated in Fig. 9.

The moldboard unit comprises the moldboard per se 270, the cutting blade 27 bolted or otherwise rigidly secured to the normally lower end of said moldboard, and the parts comprising the moldboard mount means 263, slidably carried in the holder 261 which is provided with any usual type of lock, such as that shown at 262, said lock maintaing the moldboard 270 and blade 27, in a desired laterally slideable position with respect to the holder.

The holder is pivotally carried in any desired inclined adjusted position, being partly supported by a pair of axially aligned hinging connections at 264 at the two laterally disposed portions of the holder and by means of the short strap extensions 265 of the hangers 25, and being additionally carried by the piston rod 266 of the hydraulic ram 28, the end of said rod being hingedly interconnected to the moldboard holder by lugs 267 cast with the holder, a suitable bolt indicated at 268 being passed through aligned portions of said lugs and the suitable transverse bore at the end of said ram piston rod.

The hinged connections 264 afforded by bolts 269 disposed in laterally spaced relation are positioned near a lowermost portion of the holder 261 when said holder and moldboard are in the erect position of Fig. 7, and the hinged connection 268 between the ram piston rod and said holder being then disposed at a higher elevation, so that when the piston rod is thrust outwardly from the ram cylinder, the entire moldboard assembly will rotate about the bolt 269 as a center to achieve the lowered and downwardly facing position illustrated in Fig. 9, said hinging connections 264 and 267 then being disposed in a horizontal plane substantially elevated above the moldboard 270 and blade 27 which are preferably positioned in close proximity in the underlying terrain.

*The scarifier*

Graders of the larger types, including motor graders such as illustrated herein, commonly employ a scarifier implement adapted to plow through and loosen the hard terrain disposed in advance of the grader blade 27, which immediately thereafter displaces the plowed terrain. Such scarifiers commonly employ earthworking teeth 43 which, as shown in Fig. 1, are preferably disposed in two transversely extending rows carried by a scarifier block frame 42. The frame is pendantly carried by the scarifier hangers 39, the upper ends of both hangers having their forward ends rigidly secured to the ends of a shaft 41, journalled within a tube 47, said tube being rigidly welded to the forward portion of the main frame.

Preferably extensibly adjustable lift links 48, constructed in the manner of the lift links 11, make hinging connection at their lower ends to the scarifier hangers at 48b, and at their upper ends to the operating lift cranks 49. The dual operating cranks 49 are rigidly secured by their hubs to the ends of a shaft 5s, said shaft being journalled upon a pair of brackets 50 and rigidly joining the hubs of said cranks.

Preferably, a single ram 44 is employed to adjust the swinging position of the dual cranks, the motion being transmitted through a motion multiplying linkage which comprises a system having a pair of bell crank levers with a rigid link interconnecting the two bell cranks, as in the similar mechanism of Figs. 12 and 13.

Figure 16:
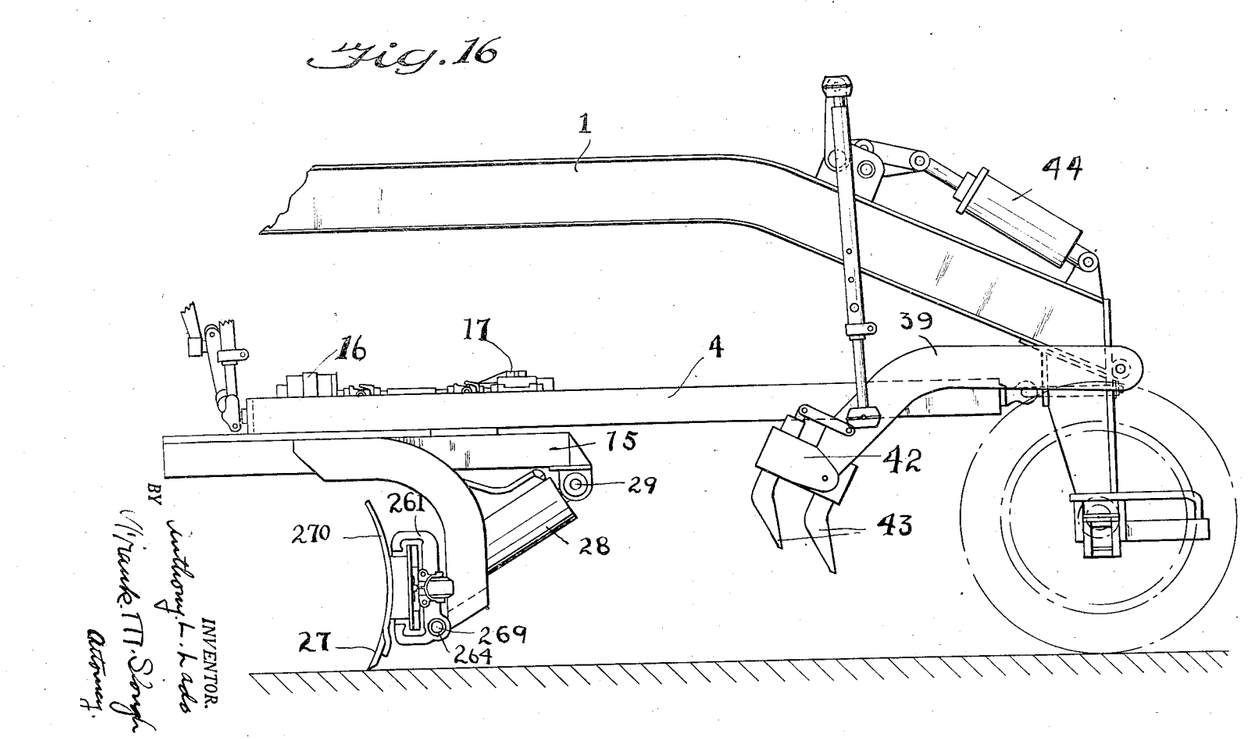
Fig. 16 is a view similar to that of Fig. 15, showing the blade and scarifier grader portion, with the blade further rotated and in position for adjustment to an upright operative position, and with the blade facing rearwardly of the vehicle.

Said similar link mechanism being previously fully described for that form illustrated in Figs. 5, 6 and 16, and employed to provide an increased swinging throw of the scarifier lift cranks 49, it will only be necessary to state that therein the levers 113s and 114s are rigidly secured to the respective shafts 5s, 4s, carrying them, said shafts being journalled in brackets 50, for rotation, said lift cranks 49 being also rigidly secured on the opposite ends of the same rotatable shaft 5s, similarly journalled, the intermediate link 118s joining the free ends of the levers 114s and 113s, and the ram piston rod 44' being flexibly secured to the junction of the lever 114s and the link 118s.

Operation of the linkage to increase the angle of movement of the shaft 5s and crank 49, over the angular throw of the ram operated lever 114s and the positions of the parts with the scarifier lifted as in Fig. 1, or lowered as in Fig. 6, will be well understood from the description of Figs. 12 and 13 in view of the foregoing explanation of differences.

With reference to the scarifier positions of Figs. 1, 15 and 16, the uppermost scarifier position possible is that wherein the scarifier frame is engaged by the superposed sub-frame 4.

*The hydraulic system and apparatus.*

Fig. 14 illustrates diagrammatically the hydraulic system, which comprises generally a motor driven hydraulic pump 60 which draws hydraulic liquid through a suction line 54' from a reservoir 54 and pumps liquid under pressure through a pressure line 79, under the control of an automatic pressure control valve 94, to various hydraulic motors comprising, besides the rotary hydraulic motor 16, the hydraulic jack or ram reciprocating motors 66, 69, 28, 89, 90, 91 and 44 respectively for leaning the front wheels, steering the front wheels, tilting the grader blade, elevating the right side of the grader sub-frame, elevating the left side thereof, laterally shifting the sub-frame and elevating the scarifier, as more fully described in my co-pending application.

Hydraulic fluid under high pressure as described is selectively supplied to said various motors by means of the conduit 79, communicating with valves 81 to 88 inclusive, by operation of selected manually operable valve control levers 80. A separate lever 80 is provided for each of the aforesaid valves and is adapted to move the valve plunger within the particular valve casing to any desired adjusted position whereby fluid from the pressure line 79 may be directed through either of a pair of conduits a and b leading therefrom, at will, to the particular motor controlled by the relatively associated valve; the other of said pair of conduits being placed in communication with the return conduit 93 leading to the relatively associated valve reservoir 54. Communication between the pressure line 79 and both of the conduits a and b of each pair may also be completely cut off, whereby liquid may be trapped therein to lock any piston of the associated motor cylinder in a desired "hold" position.

All of the reciprocating type motors employed in the illustrated grader are provided with an enclosing cylinder as shown, and a piston c longitudinally reciprocable therein according to difference in pressure at the ends of the cylinder, fluid under pressure being applied to one end of the cylinder and released from the other through the conduits a and b until the apparatus, to be adjusted by means of such motor, is adjusted to the desired degree whereupon the operator may, by moving the appropriate controlling lever 80, Fig. 1, to the proper position, block all passage of liquid from said cylinder by closing both conduits; in such case the body of liquid disposed on either side of the piston will maintain the piston in the motor cylinder, and the adjusted portion of the grader mechanism, in the achieved adjusted position until the valve controlling lever 80 associated therewith is differently adjusted.

The hydraulic fluid reservoir 54 receives liquid discharged from that chamber of any cylinder of the particular motor being operated which is disposed forwardly of the moving piston c thereof, the controlling valve for any such cylinder at such time having been adjusted by the operator by means of the associated valve lever 80, Figs. 2 and 14, to place that one of the pair of conduits a or b which communicates with such cylinder chamber in fluid flow communication with the "return line" 93 leading to the reservoir 54, while the other conduit of said pair is placed in communication with the pressure line 79.

In the said "return line" 93, as is customary in such system, there is interposed an adjustable liquid flow controlling valve 94, to so restrict the return flow from any cylinder chamber of progressively reduced volumetric capacity in order to retard, to a suitable degree, the movement of the motor piston and thereby prevent the apparatus being too rapidly adjusted by movement of the piston rod, when the ram-operated apparatus is at the desired adjusted position.

The flow of liquid to and from the rotary motor 16 is controlled in the same manner as that flowing to and from the hydraulic ram or motors, reliance for locking the circle in the rotative position to which it has been adjusted by said rotary motor being, however, also had upon the irreversible character of the worm and pinion driving connections, Fig. 3, between the shaft 19 for said rotary motor and the pinion in the case 17 which drives the circle.

Operation of reversing the blade

From the preceding description, the manner of achieving a grading operation with the vehicle moving rearwardly will now be obvious. A typical operation of this kind is achieved in the following manner, reference being mainly had to Figs. 3, 4, 7, 9, 14 and 15, with occasional reference being also conveniently made to other figures of drawing.

Assuming that the operator having possibly achieved a road grading operation including concurrent use of the scarifier and grader blade with the vehicle moving in the forward direction, reaching the end of the terrain, decides to retraverse a part or all of said graded surface and it being inconvenient or difficult for lack of space or other reasons to turn the vehicle around, the operator can regrade said surface possibly removing more of the material of the terrain than previously by reversing the facing direction of the blade and driving the vehicle rearwardly.

To prepare the mechanism for such rearward grading operation, the operator may operate the valves 81 and 87 to direct hydraulic liquid under pressure to the appropriate like ends of the lift cylinders 89 and 90 to slightly elevate both of the cranks 104 and 105 and at the same time by suitably operating the valve 86 apply pressure to the forward end of the cylinder 44 to retract the piston rod 44' to thereby point the crank 49 upwardly, as shown in Figs. 1 and 15, to lift the scarifier frame 39 to the most upward position, indicated in Figs. 1 and 15.

The operator then may, by operating the valve 88 to direct hydraulic liquid under pressure to the rearmost end of the cylinder 28, force the piston rod 266 associated with said cylinder forwardly in a diagonally downward direction to move the moldboard 270 and blade 27 from a relatively erect position such as that shown in Figs. 1 and 7 to a downwardly facing position as illustrated in Figs. 9 and 15. The moldboard assembly 260, during such operation, is fulcrumed on the bolt 269 carried by the moldboard holder 261 and the piston rod being fulcrumbed on the bolt 264 of said holder and at a laterally intermediate portion of said holder as best shown in Fig. 15.

When the moldboard has been sufficiently tilted to take the position shown in Figs. 9 and 15 the fulcruming point for the holder on the hanger arm 25 and the hinging connection between the holder and the piston rod are disposed in substantially the same horizontal plane and at the same time the uppermost portion of the holder, as best shown in Fig. 9, with the moldboard adjusted to the position shown in Fig. 9, the valve lever for the valve 8 then being restored to neutral position, liquid trapped in the lines a and b will rigidly hold the piston rod 44' and the moldboard and blade in the position shown in Fig. 9, thereupon the operator by operating the appropriate valve lever, such as that shown at 80, Fig. 2, to operate the appropriate valve 83, will direct hydraulic liquid in a circuitous course through the conduits a and b to rotate the rotatable hydraulic motor 16, whereupon the entire circle 15 will be rotated on its bearings 14 by rotation of the motor shaft 18, transmission shafts 20 and 19 through the reduction gearing in the housing 17, the gear shaft 21 being thereby rotated to drive the gear pinion on said shaft which is in mesh with the teeth 23 of the circle and said circle being operated by continued operation of the motor 16 until the moldboard and blade will have been rotated from its normal position transversely of the grader frame, as illustrated in Fig. 9, to a position where the moldboard extends longitudinally of said grader frame and thence such rotary movement being continued, will ultimately be in the desired transversely extending position and held in such position merely by closing the valve 83 by restoration of the valve handle, such as 80.

Thereupon the desired more upright position of the blade is achieved by reoperation of the valve 88 to direct liquid through the conduit leading to the forward portion of the cylinder 28 and piston rod 266 being resultantly retracted to the proper extent, said valve is reclosed and the blade is faced rearwardly of the vehicle and grading with the vehicle moving rearwardly can then be achieved to the desired depth by suitable adjustment of the lift crank levers 104 and 105 by reoperation of the valves 81 and 87 to lower said cranks.

Having described a typical operation of the mechanism involved in my present invention as applied to hydraulically controlled grader and scarifying mechanism, I am aware that numerous and extensive departures may be made from the embodiment herein illustrated and described but without departing from the spirit of my invention and the scope of the appended claims.

I claim:

1. In a mobile power grader of the type described in combination with the rotatable circle thereof, of a grading unit comprising a moldboard and blade affixed thereto, said unit having end portions which are adapted to extend outwardly beyond the confines of the circle and said end portions being relatively thin with respect to its height, a reversible hydraulic ram secured at one end to the circle and at the other end to the blade, said circle comprising pendant unit supporting means, said unit and supporting means being hingedly interconnected at a point so disposed that energization of said ram is effective to adjustably tilt said unit from a substantially upright position to a downwardly facing position, in close proximity to the underlying terrain and so that reversed energization of said ram is effective to restore said unit, power means to rotate said circle, separate remote controlling means at the same operator's station for actuating said ram in either direction and for actuating said power means whereupon, with said unit first adjusted to a downwardly tilted facing position, said circle may be rotated to reversely position longitudinal bounding edges, and said unit end portions being of such longitudinal extent, and so vertically thin as to pass any said end below portions of the grader which are disposed above said terrain a distance less than the normal height of said blade, and reversed actuation of said ram is adapted to restore said unit to said upright position but with its facing direction reversed for grading the terrain with the mobile grader moving rearwardly.

2. In a mobile power grader of the type described in combination with the vertically adjustable scarifier, and rotatable circle thereof, of a grading unit comprising a moldboard and blade affixed thereto, said unit having end portions which are adapted to extend outwardly beyond the confines of the circle and said end portions being relatively thin with respect to its height, a reversible motor secured at one end to the circle and at the other end to the blade, said circle comprising pendant unit supporting means, said unit and supporting means being hingedly interconnected at a point so disposed that energization of said motor is effective to adjustably tilt said unit from a substantially upright position to a downwardly facing position in close proximity to the underlying terrain and so that reversed energization of said motor is effective to restore said unit, power means to rotate said circle, separate remote controlling means at the same operator's station for effecting actuation of said motor in either direction and for actuating said power means whereupon, with said unit first adjusted to a downwardly tilted facing position, said circle may be rotated to reversely position longitudinal bounding edges, and said unit end portions being of such longitudinal extent, and so vertically thin as to pass any said end below any portions of the upwardly adjusted scarifier which are disposed above said terrain a distance less than the normal height of said blade, and reversed actuation of said ram is adapted to restore said unit to said upright position but with its facing direction reversed for grading the terrain with the mobile grader moving rearwardly.

3. In a mobile power grader of the type described in combination with the vertically adjustable scarifier, and rotatable circle thereof, of a grading unit comprising a moldboard and blade affixed thereto, said unit having end portions which are adapted to extend outwardly beyond the confines of the circle and said end portions being relatively thin with respect to its height, a motor secured at one end to the circle and at the other end to the blade, said circle comprising pendant unit supporting means, said unit and supporting means being hingedly interconnected at a point so disposed that energization of said motor is effective to adjustably tilt said unit about the axis of said interconnecting hinge, power means to rotate said circle, separate remote controlling means at the same operator's station for effecting actuation of said motor and for actuating said power means whereupon, with said unit first adjusted to a downwardly tilted facing position, said circle may be rotated to reversely position longitudinal bounding edges, and said unit end portions being of such longitudinal extent, and so vertically thin as to pass any said end below any portions of the upwardly adjusted scarifier which are disposed above said terrain a distance less than the normal height of said blade, and reversed actuation of said ram is adapted to restore said unit to said upright position but with its facing direction reversed for grading the terrain with the mobile grader moving rearwardly.

4. The combination with the blade supporting circle of a power grader of the type described, the vertically adjustable scarifier disposed in advance of said circle and separate reversible power means for vertically adjusting said scarifier and rotating said circle, of separate controlling means at a single operator's station for controlling the operation of each said power means, a moldboard unit comprising a moldboard and a blade having a normally lowermost cutting edge, said unit being hingedly interconnected with a pendant rigid element of said circle on an axis extending parallel with and normally rearwardly of said cutting edge, of a power ram secured above said cutting edge, of a power ram secured at one end to said circle and at the other end to said unit at a normally different level than the normal elevation of hinge interconnection, and a third control means at said operator's station for alternately so effecting actuation of said ram to tilt said moldboard either from a substantially erect position to a substantially horizontal downwardly facing position or the converse thereof, the thickness of the outer ends of said unit being considerably less than its normal height when erect and the longer unit dimension being such that said unit may be downwardly tilted, then rotated with an end portion passing between the underlying terrain and the lowermost parts of the previously upwardly adjusted scarifier, to such desired rotative position that subsequent reversed actuation of said ram will be effective to place said unit in a substantially erect reversely facing position.

5. In a mobile power grader of the type described having a vertically adjustable grader blade unit and a scarifier unit, said scarifier unit adapted for limited vertical adjustment, separate power means operable under control of associated separate control means at a single operator's station for independently controlling the vertical adjustment of said scarifier and grader blade units, a rotatable grader blade unit supporting circle, hanger means supporting said grader blade unit being rigidly affixed to said circle, hinge means operative on a transverse axis interconnecting the lower end portions of said hanger means and a rearwardly extending projection of said blade unit, a hydraulic ram device also interconnecting said unit and said circle comprising a relatively fixed member and a movable member, one of said members being flexibly secured to the circle and the other said member being flexibly secured to said blade unit, the flexing axis of said last flexible connection being disposed in a horizontal plane parallel to and vertically spaced from the horizontal plane of said hinge means, control means at the said operator's station for alternatively hydraulically actuating said ram to adjustably move the movable member thereof in either alternate direction or to hydraulically hold said movable member stationary, power means for adjustably rotating said circle and manually operable means at said station for so controlling the actuation of said power means whereby to adjustably rotate said circle in either alternate direction or to lock said circle in a stationary adjusted position, said ram, when said movable member is moved in one direction, adapted to tilt said unit from an upright position to a downwardly facing position, whereupon operation of said circle rotating power means may subsequently swing the downwardly facing blade end portions in a plane disposed closely to the terrain and below the lower ends of the upwardly adjusted scarifier to a desired rotative adjusted position whereat reversed actuation of said ram under the control of the associated manually operable control means is effective to restore said blade to an upright position, with the blade facing rearwardly of the vehicle.

6. In a vehicular road grading and scarifying machine comprising a longitudinally extending upwardly arched frame, forward and rear wheels for carrying said frame, and a sub-frame flexibly secured at its narrow forward portion to a forward portion of the main frame, a scarifier hingedly supported at its forward end to the forward end of the main frame and comprising a scarifier block, scarifier teeth extending downwardly from said block at its rear end, a grader blade rotatably pendantly secured to the rear portion of said sub-frame, said blade being of such lateral extent as to extend beyond the sides of said main frame when rotatably adjusted to a transversely extending position, and its lateral extent being less than the distance between the front and rear wheels of the vehicle, a first fluid pressure operated mechanism for adjustably lifting and lowering the scarifier, a second fluid pressure operated mechanism for lifting and lowering the rear portion of said sub-frame to adjustably elevate or depress the blade carried thereby, means comprising a hydraulic ram for variously inclining the blade over a range from an upright operative attitude to a downwardly facing attitude, a rotary hydraulic motor for rotatably adjusting said blade about a substantially vertical axis over an angle of at least 180°, and controlling means adapted to be so operated as to so adjust each of said fluid pressure operated mechanisms, ram and rotary motor, so as to elevate the scarifier teeth, to incline the blade to a downwardly facing attitude, to lower said downwardly facing blade below the level of the lowermost portions of said scarifier teeth, and to effect such rotation of said blade by said motor as to pass an end portion of the downwardly facing blade transversely below and beyond the scarifier teeth to so reverse the facing direction of said blade, whereby grading may be alternatively achieved with the grader moved rearwardly when said blade is restored to a normal operative attitude.

7. In a road grading and scarifying machine comprising a longitudinally extending upwardly arched frame and a sub-frame flexibly secured to a forward portion of the main frame, a scarifier frame hingedly supported at the forward end of the main frame and having scarifier teeth extending downwardly from its said frame, a grader blade supporting circle pendantly secured to the rear portion of said sub-frame and journalled thereon for rotational movement in a plane parallel to that of said sub-frame, a plurality of hydraulically operable mechanisms comprising a fluid pressure operated device for adjustably lifting and lowering the scarifier, hydraulically operable lift means for lifting and lowering the rear portion of said sub-frame to adjustably elevate or depress the blade carried thereby, fluid pressure operable ram means for variously inclining the blade from a forwardly facing attitude to a downwardly disposed horizontal attitude, and a hydraulically operable motor means for rotatably adjusting said blade about a substantially vertical axis, a plurality of valve means, each adapted to be selectively so operated as to adjust each of said fluid pressure operated mechanisms so as to elevate the scarifier teeth, and to effect such rotation of said horizontally disposed blade by said motor as to pass an end portion of the said blade transversely below and beyond said elevated scarifier teeth to so reverse the facing direction of said blade, whereby grading may be alternatively achieved with the grader moved rearwardly when said blade is restored to a normal operative attitude.

8. In a road grading and scarifying machine comprising a longitudinally extending upwardly arched frame and a sub-frame flexibly carried by the rear portions of the main frame, an operator's station on said machine controlling means at said station, a scarifier frame hingedly supported at the forward end of the main frame and having scarifier teeth extending downwardly from its said frame, ram motor means operable for adjustably elevating said scarifier to place said teeth in variously elevated positions including an uppermost position when the upper portion of said scarifier frame is in engagement with the under surface of said sub-frame forwardly of said grader blade, separate fluid pressure operated mechanism for adjustably lifting and lowering the sub-frame, blade hanger means for pendantly supporting said blade from said sub-frame, motor means carried by said sub-frame for rotating said hanger means and blade about an upwardly extending axis, means comprising a hinge connection so interconnecting the portion of said blade nearest its cutting edge with the lower end portion of said hanger means, whereby said blade may be adjustably swung on said hinge means to a face-downward attitude to position the blade below the level of said hinge means, separate motor means adapted to adjustably swing said blade on its transverse hinge axis, said controlling means adapted to control the operation of said motor means, said ram motor means, and said separate motor means, whereby the scarifier may be lifted to an upper position, said blade may be downwardly positioned and faced, and said blade rotated to such an extent as to cause said blade, upon retraction of said blade to its normal operative attitude to face rearwardly of the vehicle.

9. The machine as set forth in claim 3 characterized by said motors being of the two-way hydraulic type and said controlling means comprising a source of liquid under pressure, and a plurality of selectively operable valves, and by the provision of conduit means interconnecting each end of each said motor, through different of said valves, with said source.

ANTHONY L. LADO.

No references cited.